United States Patent Office 3,843,548
Patented Oct. 22, 1974

3,843,548
COMPOSITIONS CONTAINING A SOURCE OF
HYPOCHLORITE IONS
Ronald James, Ruislip, England, assignor to Wilkinson
Sword Limited, London, England
Filed Sept. 28, 1971, Ser. No. 184,510
Claims priority, application Great Britain, Oct. 6, 1970,
47,354/70
Int. Cl. C11d 7/54
U.S. Cl. 25—187 H          11 Claims

ABSTRACT OF THE DISCLOSURE

The invention relates to compositions containing a source of hypochlorite ions.

Figures 1, 2:
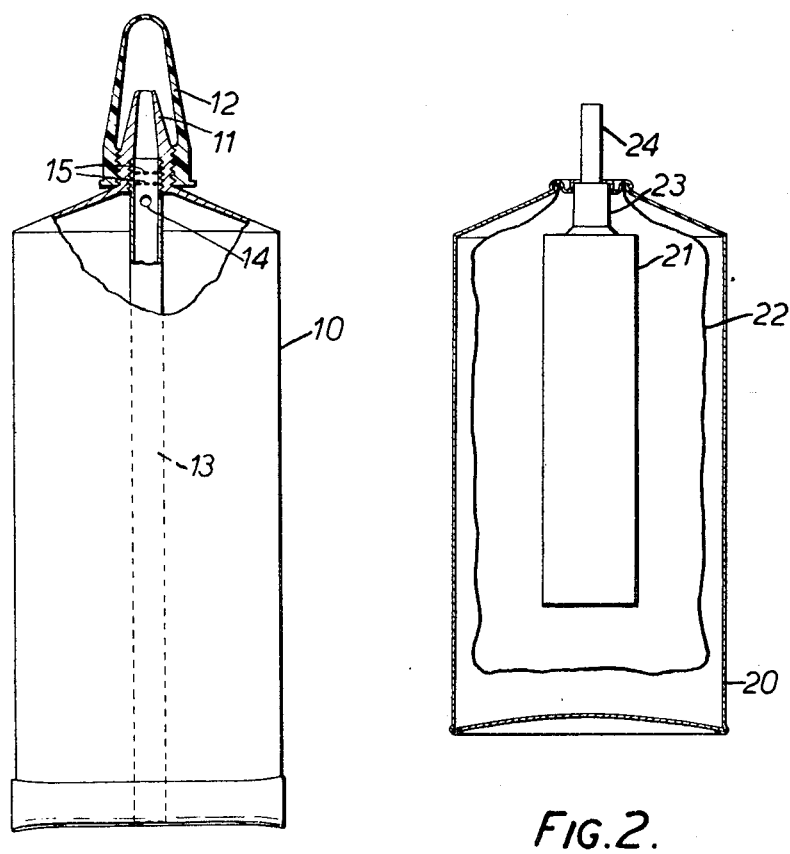

It has been proposed to make pastes or gels containing a source of hypochlorite ions by using ordinary clay as the gel-forming medium. We have found that such pastes or gels do not have sufficient stability. To overcome this difficulty we propose to use in place of ordinary clay a synthetic magnesium silicate in which a proportion of the magnesium atoms have been replaced by lithium atoms, for example from 5% to 15% of the magnesium sites are occupied by lithium atoms.

The compositions have germicidal, fungicidal and proteolytic properties which make them particularly useful for medical and veterinary purposes.

---

This invention relates to compositions which contain a source of hypochlorite ions.

In United States patent specification 1,813,109 reference is made to the fact that pastes composed of a halogenated antiseptic substance and gelatine, starch, or like absorbents, are very unstable due to the chemical action of free halogen upon these media. In fact it is our belief that the instability would be due to the chemical action of the hypochlorite rather than that of the free halogen. The specification further states that when prepared with other absorbent media, such as ordinary clay, the resulting product frequently either does not possess the desired pasty or gelatinous consistency or is not sufficiently stable or has other objectionable characteristics. We have found that quite apart from any other objectionable characteristics, none of these products has the necessary stability. With these disadvantages in mind U.S. specification 1,813,109 proposes an antiseptic composition comprising a water-absorptive, gel-forming bentonite clay and a halogenated antiseptic substance, for example sodium hypochloride.

One object of the present invention is to provide a composition which is more stable than the composition proposed in U.S. specification 1,813,109.

According to the present invention there is provided a composition comprising a water absorptive clay and a source of hypochlorite ions characterised in that said water-absorptive clay is a synthetic magnesium silicate in which a proportion of the magnesium atoms have been replaced by lithium atoms.

An important use of the compositions is for medical or veterinary purposes, for example for the treatment of burns, wounds, etc. for which purposes the compositions have desirable germicidal, fungicidal, and proteolytic properties. The compositions may also be used for other purposes where hypochlorite is useful, for example for bleaching and for disinfecting.

The preferred synthetic water absorptive clay is a magnesium silicate having partial replacement of magnesium atoms by lithium atoms. From 5% to 15% of the magnesium sites may be occupied by lithium atoms, more particularly from 8% to 12% may be so occupied. The structural units have negative charges, which result from the partial replacement of magnesium atoms by lithium atoms, and to a lesser extent, from unoccupied magnesium sites. The negative charges are balanced by exchangeable cations; for best absorptive properties, these are monovalent, and are normally sodium ions, but may also be other monovalent cations such as lithium or potassium. The silicate structure of this class of synthetic clay is equivalent to that of the natural Hectorite, and the synthetic clays have X-ray diffraction patterns which are similar to those of natural Hectorite.

A typical composition of this synthetic clay in which approximately 10% of the magnesium sites are occupied by lithium atoms is as follows:

$SiO_2$—60.4% on a dry weight basis
MgO—26.0%
$Li_2O$—1.1%
$Na_2O$—3.0 %
$Fe_2O_3$—0.02%
CaO—0.20%
$SO_3$—0.10%
$CO_2$—0.29%
$H_2O$—6.9%.

The synthetic clay gives the composition a paste-like consistency when present in proportions by weight of about 3.0 to 8.0%, which is a particularly suitable form for application to burns, wounds etc. Application is facilitated by the fact that the compositions are thixotropic and yet can be applied in thicknesses of up to a centimetre without deforming under the force of gravity.

Examples of the source of hypochlorite ions which may be used are alkali metal hypochlorites, such as lithium hypochlorite and sodium hypochlorite.

Another appropriate source are the alkali metal salts of non-metallic inorganic acids, for example alkali metal salts of N-chlorosulphamic acid, NN-dichlorosulphamic acid or N-chloroimidodisulphonic acid. Another possible source of hypochlorite ions comprises an organic compound which yields hypochlorite ions in contact with water, particularly those which contain a thermodynamically stable nitrogen-chlorine bond. Thus, examples of other possible sources are chlorimides such as N-chlorosuccinimide, chloroazodin, N-chloroanilides, N-chlorosulphonamides such as chloramine-T, and similar compounds such as chlorinated melamines, or N-chloroazo-dicarbonamide.

It is preferred to use lithium hypochlorite because the resultant aqueous composition has good stability and desirable physical properties. A typical commercially available lithium hypochlorite may contain 30% LiOCl, the remainder being a mixture of inorganic compounds which are beneficial to the stability of the final composition, including alkali metal sulphates, hydroxides, chlorates and chlorides.

A typical source of hypochlorite ions may be prepared by mixing commercially available lithium hypochlorite with up to 5% in total of lithium chloride and/or potassium chloride and up to 1.0% in total of lithium hydroxide and/or potassium hydroxide expressed as weight percentages of the solution. The hydroxide raises the pH and gives enhanced storage stability.

The source of hypochlorite ions can be totally in solution, or it can be partly in suspension. Preferably, for medical and veterinary compositions the proportion, expressed as available chlorine by weight lies between 0.1 and 1.0%.

A suitable pH value for a composition will be dependent upon the intended use of the composition. Thus, for a medical composition in which it is desired to attain the optimum proteolytic properties without damage to living tissue, a pH value of about 7.5 to 10.5 is desirable; the value of 10.5 can be exceeded, even up to pH 11.5, for the treatment of certain conditions such as ulcers and very deep burns, but for burns in which the depth varies, it is preferred not to exceed a pH value of about 10.5. The stability of hypochlorites and hypochlorite sources in solution is strongly dependent on pH; in the absence of any significant quantity of transitional metal catalysts, solutions of higher pH are more stable; the increase of stability with pH is less marked at pH values greater than 10 units. In the absence of any significant quantity of transitional metal catalysts, the partial decomposition of hypochlorites in solution results in a reduction of the pH value of that solution so that further decomposition proceeds at a faster rate; the decomposition is thus effectively autocatalytic.

In common with all hypochlorites in solution the compositions of the invention decompose slightly during storage. To enhance the stability of the compositions it is preferred to buffer the solutions so that any decomposition during storage is accompanied by minimal reduction of pH; suitable buffer mixtures are hydroxyl ion/boric acid, hydroxyl ion/alkali-metal bicarbonate, and hydroxyl ion/borax. There is a tendency for the borax mixture to interfere with the physical properties of the composition but buffering with borax or boric acid results in better storage behaviour than does buffering with bicarbonate. The compositions can also be adjusted to suitable pH values by the addition of acid or alkali.

A number of examples of compositions in accordance with the present invention will now be given:

EXAMPLE 1

2000 grams of buffer solution was prepared from 2.1 grams of sodium hydroxide and 6.6 grams of sodium bicarbonate in distilled water. Of this buffer solution, 1568 grams was heated to boiling and 100 grams of a synthetic magnesium silicate water absorptive clay having partial replacement of magnesium by lithium was added with high speed stirring. The mixture was maintained at 95° C. and stirring was continued until all the synthetic clay particles had dispersed. The paste was cooled to 25° and a solution of 32 grams of commercially available lithium hypochlorite (as referred to hereinbefore) in 300 grams of buffer solution was added. Finally, the pH was adjusted to 10.5 by the slow addition, whilst stirring, of drops of strong sodium hydroxide solution.

The resultant composition was a nearly clear paste which retained its physical properties during storage at room temperature, and contained 5% of synthetic clay and 0.5% by weight of available chlorine.

EXAMPLE 2

Using the method of preparation described in Example 1 but with a sodium hydroxide/borax buffer solution, a composition of pH 10.5, containing 0.5% by weight of available chlorine and 4.5% of synthetic clay was prepared.

This composition when stored at 25° C. for 10 months lost 4.6% by weight of the initial available chlorine; the pH value dropped by 0.2 units.

EXAMPLE 3

Using the method of preparation described in Example 1, but with a sodium hydroxide/sodium bicarbonate buffer, a composition of pH 10.5, containing 0.5% by weight of available chlorine and 4.5% by weight of synthetic clay was prepared.

This composition when stored at 25° C. for 5½ months lost 20% of the initial available chlorine; the pH value dropped 0.5 units.

Samples from a separate batch, prepared by the same method, were packed by heat sealing into plastic sachets and stored separately at 25° C. and 40° C. After four months of storage, the reduction of the initial available chlorine of the sample stored at 25° C. was approximately 8.0% by weight and of the sample stored at 40° C. was approximately 50.0% by weight.

EXAMPLE 4

A composition was prepared as described in Example 1, but using water in place of buffer solution and chloromine T in place of lithium hypochlorite. The composition contained 0.5% by weight of available chlorine and was submitted to accelerated storage at 40° C. for seven days, during which period the pH value changed from 11.1 to 10.3 units, and 2% by weight of the initial available chlorine was lost. The physical structure of the composition was unchanged.

Equivalent samples prepared from sodium hypochlorite, chloroazodin, and N-chlorosuccinimide were subjected to the same accelerated test, and no change in physical properties resulted.

EXAMPLE 5

The method of preparation described in Example 1, but with a sodium hydroxide/boric acid buffer, was used to give a composition of pH 9.0 containing 0.5% by weight of available chlorine.

EXAMPLE 6

The method of preparation described in Example 1, but with a sodium hydroxide/sodium bicarbonate buffer was used to produce a composition of pH 10.2 containing 1.86% by weight of available chlorine and 6.0% of synthetic clay.

The enhanced stability possessed by compositions in accordance with the invention will be apparent from the following results of comparison trials between a composition with 6% by weight of synthetic clay prepared as in Example 5 and compositions buffered to pH 9.0 and differing from the composition of Example 5 only in respect of the gel-forming substance used, the latter *not* being in accordance with the invention. Comparative storage tests were conducted for nine months both at 7° C. and at 25° C. to determine the reduction in pH and the percent by weight loss of available chlorine, with the following results:

TABLE I

| Gel-forming substance | At 7° C. | | At 25° C. | |
|---|---|---|---|---|
| | pH decrease (units) | Percent available chlorine loss | pH decrease (units) | Percent available chlorine loss |
| A colloidal attapulgite | 0.9 | 98 | 0.8 | 100 |
| A colloidal magnesium aluminium silicate | 0.3 | 28 | 0.7 | 92 |
| White bentonite | 0.3 | 31 | 0.8 | 98 |
| Grey bentonite | 0.2 | 28 | 0.5 | 91 |
| As Example 5 | 0.0 | 15 | 0.0 | 67 |

Similar storage tests were made for four months comparing the compositions of Example 5 with five compositions differing therefrom only in that natural Hectorite was used for the gel-forming substance, the Hectorite in each of the five compositions being of a different commercially available form indicated below as "A" to "E" respectively. The following results were obtained:

TABLE II

| Gel-forming substance | At 7° C. | | At 25° C. | |
|---|---|---|---|---|
| | pH decrease (units) | Percent available chlorine loss | pH decrease (units) | Percent available chlorine loss |
| Hectorite "A" | 0.1 | 38 | 0.35 | 64 |
| Hectorite "B" | 0.25 | 26 | 0.65 | 79 |
| Hectorite "C" | 0.1 | 37 | 0.3 | 69 |
| Hectorite "D" | 1.9 | 100 | 1.5 | 100 |
| Hectorite "E" | 0.35 | 29 | 0.7 | 81 |
| As Example 5 | 0.0 | 8 | 0.1 | 48 |

In further tests, solutions of lithium hypochlorite containing 0.5% by weight of available chlorine were buffered to various pH values with sodium hydroxide/boric acid or with sodium hydroxide/sodium bicarbonate. Compositions in accordance with the invention having 6% by weight of synthetic clay were also prepared from lithium hypochlorite to give the same percent of available chlorine and were buffered as above to the same values. The samples were stored at 25° C. in glass containers for ten weeks. Table III gives the changes which occurred.

TABLE III

Sodium hydroxide/boric acid

| Initial pH | Decrease in pH | | Percent loss of avail. chlorine | |
|---|---|---|---|---|
| | Soln. | Compn. | Soln. | Compn. |
| 9 | 0.1 | 0.1 | 37.5 | 37.7 |
| 10 | 0.2 | 0.3 | 2.0 | 4.0 |
| 11 | 0.2 | 1.1 | 2.0 | 2.2 |

Sodium hydroxide/sodium bicarbonate

| | | | | |
|---|---|---|---|---|
| 9 | 0.1 | 0.1 | 38.6 | 37.2 |
| 10 | 0.1 | 0.1 | Zero | 2.1 |
| 11 | 0.2 | 0.7 | 4.0 | Zero |

It will be noted that the solutions and their equivalent gelled compositions exhibit identical storage characteristics within the limits of experimental error, thereby confirming that loss of available chlorine during storage is not due to the presence of the synthetic clay, whereas Tables I and II clearly show that such loss is accelerated by the use of gel-forming substances other than those which fall within the present invention.

The compositions may be sold in appropriate containers of conventional kind. Because of their thixotropic nature they may, if desired, be dispensed as a spray.

According to a feature of the invention it is proposed to store a concentrate of the composition separately from a larger quantity of an inert gel or paste-like diluent, for example 3 to 10 times larger by volume. In this way the concentrate can have a higher pH than that appropriate for usage, longer storage life being achieved as a result of the higher pH.

The concentrate is stored in one compartment of a container and the larger quantity of gel-forming substance or liquid in a second compartment. The container has a mixing zone in which the contents of the two compartments are mixed immediately prior to discharge as they are progressively expelled from their respective compartments whereby the paste expelled has the lower pH and lower available chlorine concentration desired for usage. Because the larger quantity of the gel-forming substance is not in contact with the source of hypochlorite ions it is not essential to use a synthetic clay for the diluent, although it is preferred to do so.

Two possible constructions of dual-storage containers in accordance with the invention will now be described, by way of example only, with reference to the accompanying drawing, in which:

FIG. 1 is a cross-sectional view of the first construction of dual-storage container, whilst FIG. 2 is a similar view of the second construction.

Referring now to FIG. 1 the container illustrated comprises a collapsible envelope 10, for example of inert plastics or plastics-lined metal foil, having an outlet nozzle 11 at one end which is closed by a cap 12 prior to discharge of the contents. A thin-walled flexible plastics tube 13 is sealed at one end to the inner end of the nozzle 11 and at the other end is sealed to the end of the envelope 10 remote from the nozzle 11. Holes 14, or preferably one-way valves, are provided in the wall of the tube 13 adjacent its nozzle end. The concentrate of the composition is stored in the tube 13 and the gel diluent in the remainder of the envelope 10. When the composition is to be dispensed the envelope 10 is rolled up from the end remote from the nozzle 11, the tube 13 being rolled up simultaneously. As this rolling up is effected the gel diluent passes through the holes or one-way valves 14 and mixes with the concentrate so that the composition leaving the nozzle 11 has a lower pH and lower concentration of available chlorine than that of the concentrate. Baffles 15, or other appropriate means, can be provided to enhance mixing during outward passage of the composition.

The container illustrated in FIG. 2 comprises an outer housing 20 containing an inner collapsible envelope 21 and an outer collapsible envelope 22. The neck of the outer envelope 22 is sealed to the neck of the housing 20 and the space between the envelope 22 and the housing 20 contains a pressurising agent, for example a hydrocarbon propellant. The neck of the inner envelope 21 is sealed to a valve 23 which is connected to an outlet nozzle 24. The concentrate of the composition is stored in the inner envelope 21 and the gel diluent in the outer envelope 22. When the valve 23 is operated the contents of both envelopes 21 and 22 flow out through the nozzle 24, under the pressure of the pressurising agent, mixing as they do so. The nozzle 24 may be shaped to facilitate mixing. If a spray is required the nozzle can be provided with an aerosol spray head.

For spray application the outer envelope is not essential, the gel diluent being stored in the housing 20 with with a dip tube extending from the valve to adjacent the base of the housing 20, the pressurising agent having a specific gravity less than that of the gel diluent.

I claim:

1. A composition consisting essentially of a water-absorptive clay and a source of hypochlorite ions, said source of hypochlorite ions being a member selected from the group consisting of alkali metal hypochlorites, alkali metal salts of non-metallic inorganic acids, and organic acids containing a thermodynamically stable nitrogen-chlorine bond which hydrolyses to provide hypochlorite ions, wherein said water-absorptive clay is a synthetic magnesium silicate in which a proportion of the magnesium atoms have been replaced by lithium atoms, said synthetic magnesium silicate being present in an amount of from about 3% to 8% by weight, the amount of said source of hypochlorite ions being such that the available chlorine content of said composition is from 0.05% to 3.0% by weight.

2. A composition according to claim 1, wherein said synthetic magnesium silicate has from 5% to 15% of the magnesium sites occupied by lithium atoms.

3. A composition according to claim 1, wherein said synthetic magnesium silicate has from 8% to 12% of the magnesium sites occupied by lithium atoms.

4. A compositon according to claim 1, wherein said synthetic magnesium silicate has a structure equivalent to that of natural Hectorite and X-ray diffraction patterns similar to those of natural Hectorite.

5. A composition according to claim 1, wherein said source of hypochlorite ions is an alkali metal hypochlorite.

6. A composition according to claim 5, wherein said alkali metal hypochlorite is lithium hypochlorite.

7. A composition according to claim 5, wherein said alkali metal hypochlorite is sodium hypochlorite.

8. A composition according to claim 1, wherein said source of hydrochlorite ions is a compound containing a thermodynamically stable nitrogen-chlorine bond which hydrolyses to provide hypochlorite ions.

9. The method for making a composition comprising a water-absorptive clay and a source of hypochlorite ions, said source of hypochlorite ions being a member selected from the group consisting of alkali metal hypochlorites, alkali metal salts of non-metallic inorganic acids, and organic acids containing a thermodynamically stable nitrogen-chlorine bond which hydrolyses to provide hypochlorite ions, which method comprises the steps of dispersing in a solution which is at elevated temperature a synthetic magnesium silicate in which a proportion of the magnesium atoms have been replaced by lithium atoms, allowing said dispersion to cool, and thereafter adding said source of hypochlorite ions, said synthetic magnesium silicate being present in an amount of from about 3% to 8% by weight, the amount of said source of hypochlorite ions being such that the available chlorine content of said composition is from 0.05% to 3.0% by weight.

10. The method of making a composition comprising a water-absorptive clay and a source of hypochlorite ions, said source of hypochlorite ions being a member selected from the group consisting of alkali metal salts of non-metallic inorganic acids, and organic acids containing a thermodynamically stable nitrogen-chlorine bond which hydrolyses to provide hypochlorite ions, which method comprises the steps of preparing a buffer solution, heating said buffer solution to an elevated temperature, dispersing in said heated buffer solution a synthetic magnesium silicate in which a proportion of the magnesium atoms have been replaced by lithium atoms, allowing said dispersion to cool and, finally, adding said source of hypochlorite ions, said synthetic magnesium silicate being present in an amount of from about 3% to 8% by weight, the amount of said source of hypochlorite ions being such that the available chlorine content of said compositions is from 0.05% to 3.0% by weight.

11. The method according to claim 10, wherein said composition is buffered to a pH value of between 7.5 and 11.5.

References Cited
UNITED STATES PATENTS

| | | | |
|---|---|---|---|
| 1,813,109 | 7/1931 | Banks | 424—149 |
| 3,558,496 | 1/1971 | Zmoda | 424—149 |

CARL D. QUARFORTH, Primary Examiner

I. GLUCK, Assistant Examiner

U.S. Cl. X.R.

252—313 S; 423—474; 424—149